(12) United States Patent
McGrath et al.

(10) Patent No.: US 8,997,200 B2
(45) Date of Patent: Mar. 31, 2015

(54) ELECTRONIC DEVICE FOR COMMUNICATION IN A DATA NETWORK INCLUDING A PROTECTIVE CIRCUIT FOR IDENTIFYING UNWANTED DATA

(71) Applicants: Kevin McGrath, Oslo (NO); Alexander Wold, Kolbotn (NO)

(72) Inventors: Kevin McGrath, Oslo (NO); Alexander Wold, Kolbotn (NO)

(73) Assignee: ABB Research Ltd. (CH)

( * ) Notice: Subject to any disclaimer, the term of this patent is extended or adjusted under 35 U.S.C. 154(b) by 29 days.

(21) Appl. No.: 13/895,997

(22) Filed: May 16, 2013

(65) Prior Publication Data

US 2013/0254869 A1 Sep. 26, 2013

Related U.S. Application Data

(63) Continuation of application No. PCT/EP2010/067608, filed on Nov. 16, 2010.

(51) Int. Cl.
*G06F 9/00* (2006.01)
*H04L 29/06* (2006.01)
*H04L 12/26* (2006.01)

(52) U.S. Cl.
CPC ........ *H04L 63/0245* (2013.01); *H04L 12/2602* (2013.01); *H04L 43/00* (2013.01); *H04L 63/1458* (2013.01); *H04L 63/162* (2013.01)
USPC .............................................. 726/11; 726/13

(58) Field of Classification Search
CPC .............. H04L 63/029; H04L 63/1416; H04L 63/1425; H04L 63/145; H04L 63/1466; H04L 63/16; H04L 63/162; H04L 63/164; H04L 63/166; H04L 63/168; G06F 21/70; G06F 21/72

USPC .................. 726/11–14, 22–24; 713/150–154, 713/160–162; 709/223–224
See application file for complete search history.

(56) References Cited

U.S. PATENT DOCUMENTS

| 5,903,562 | A | 5/1999 | Engel et al. |
| 6,092,110 | A * | 7/2000 | Maria et al. ................... 709/225 |

(Continued)

FOREIGN PATENT DOCUMENTS

WO 2006138403 A2 12/2006

OTHER PUBLICATIONS

International Preliminary Report on Patentability Application No. PCT/EP2010/067608 Completed: Apr. 18, 2013 11 pages.

(Continued)

*Primary Examiner* — Hosuk Song
(74) *Attorney, Agent, or Firm* — St. Onge Steward Johnston & Reens LLC

(57) ABSTRACT

An electronic device for communication in a data network including a communication circuit adapted for performing the network communication, which communication includes controlling a plurality of network layers, the layers including a physical layer, a link layer and at least one higher order layer, the communication circuit includes a protective circuit for identifying unwanted data. The electronic device is characterized in that the protective circuit is arranged to monitor data during transmission of data from the electronic device, and identify unwanted data, and the communication circuit is adapted to avoid transmission of the unwanted data identified by the protective circuit. In this way the network is protected against excessive traffic, for example during a Denial of Service attack.

15 Claims, 3 Drawing Sheets

Standard Ethernet

(56) References Cited

U.S. PATENT DOCUMENTS

| | | | |
|---|---|---|---|
| 6,453,345 B2* | 9/2002 | Trcka et al. | 709/224 |
| 7,269,649 B1* | 9/2007 | Brown et al. | 709/224 |
| 7,301,899 B2* | 11/2007 | Goldstone | 370/230 |
| 7,606,214 B1 | 10/2009 | Chandra Sekhar et al. | |
| 7,805,759 B2* | 9/2010 | Tang et al. | 726/22 |
| 2002/0080771 A1 | 6/2002 | Krumel | |
| 2005/0108434 A1 | 5/2005 | Witchey | |
| 2005/0120243 A1 | 6/2005 | Palmer, Jr. et al. | |
| 2006/0168273 A1 | 7/2006 | Michael | |
| 2008/0165769 A1 | 7/2008 | Aldaz et al. | |

OTHER PUBLICATIONS

International Search Report and Written Opinion of the International Searching Authority Application No. PCT/EP2010/067608 Completed: Aug. 3, 2011; Mailing Date: Aug. 10, 2011 10 pages.

Written Opinion of the International Preliminary Examining Authority Application No. PCT/EP2010/067608 Mailing Date: Mar. 12, 2013 6 pages.

* cited by examiner

Standard Ethernet

OSI Model

ELECTRONIC DEVICE FOR COMMUNICATION IN A DATA NETWORK INCLUDING A PROTECTIVE CIRCUIT FOR IDENTIFYING UNWANTED DATA

FIELD OF THE INVENTION

The invention relates to systems for limiting traffic in a computer network, especially an Ethernet network. The present invention is concerned with an electronic device used in an industrial context, and especially an electronic device for connection to, and communicating by means of, a computer network. In particular it is concerned with an electronic device used in or connected to a system for monitoring and control such as a system for generation, transmission or distribution of electricity or for an industrial process control system.

BACKGROUND OF THE INVENTION

Many electronic devices in modern control systems are arranged with some kind of built-in intelligence. Such devices are often a part of or referred to as embedded devices. Control systems for industrial process control and systems for control in generation, distribution and transmission of electricity are often connected to the industrial equipment that the control system monitors and controls via one or more data communication networks that use industry standard such as Ethernet based protocols. This has standardised and simplified industrial data communication for the purposes of monitoring and control. Electronic devices that may be connected to a control system using an industrial Ethernet standard are included in many and various devices, for example instruments such as sensors or transducers, actuators such as valves, motors, pumps, switches, as well as controls on major equipment such as generators, transformers, breakers, power trains and so on.

An example of deliberate creation of excessive traffic is a so called Denial of Service attack, wherein an attacker tries to create traffic to exceed the capacity of the network, or capacity of a device to handle the traffic while being able to communicate as specified. For example, by broadcasts that leads to excessive traffic when responded to by all, or many, of the electronic devices in the network.

Known methods for network traffic filtering is using software for providing the filtering, or an external firewall, or a combination of those. In such firewalls or software filters, the filtering of network traffic takes place after the packet is received by the filtering system.

US2006/0168273A1 document 1 (D1) discuss protection against hostile and other unwanted data on computer networks, and describes methods and apparatuses for removing data frames or data packets from data communication links. The background section of D1 discusses two systems of protection against unwanted data, with reference to FIGS. 2a and 2b. D1 uses the OSI model as a framework for describing a communication link, wherein a transmitting node sends data segments in the form of frames or packets to a receiving node that receives the frames or packets. These packets are subsequently moved up from layer to layer in the receiving node until they reach their destination. In the two data network examples of the background, each data segment is transmitted from one communication node to another communication node via a communication link arranged between the nodes, and each transmitted data segment reaches the receiving node and is processed by the receiving node. FIG. 2a illustrates a system, wherein a firewall (26 in D1, see also §17) is utilised for removing data frames or packets from a communication link (22). The firewall (26) is inserted in the communication link (22), in the form of an intermediate node, between the transmitter (25) and the receiver (27). The firewall (26) processes the data segments (28) and deletes unwanted data segments (28). FIG. 2b illustrates another system (see §21), wherein a firewall (25) implements the OSI seven layer mechanism to buffer data sent from a transmitter (21) through a communication link (22). The firewall (25) processes the data received via the communication link (22), deletes unwanted data, and only resends allowed data through another communication link (26) to the receiving node (24). In D1 some drawbacks of these systems are considered; a firewall in the form of an intermediate node (26 in FIG. 2a) employing a plurality of the OSI layers has to be inserted in the link in the first system (FIG. 2a), and the firewall (25 in FIG. 2b) buffers the data and an additional link (26 in FIG. 2b) has to be employed.

The invention of D1 avoids these drawbacks by presenting a non-intrusive protection against unwanted data segments that are transmitted through a data communication link. D1 describes a method and apparatus (see §26-27) for removing data frames or data packets from data communication links, wherein a detector detects unwanted data segments and an invalidator, which is associated with the detector, invalidates the unwanted data segment. The detection and invalidation does not interfere with the data flow through the communication link. The system of D1 utilises a control mechanism already present in the communication system, for example (§60), an error control mechanism in Layer 2 of the OSI model, so that unwanted data segments are deleted by the receiver. Typically, the invalidating includes inserting a detectable error (see §29). The method and apparatus generally utilises an error detecting mechanism present in the communication system, which error detecting mechanism discards erroneous packets (§62). The mechanism of D1 can be provided by adding an apparatus, including detector and invalidator, to a communication link between two nodes, which apparatus invalidates unwanted packets (FIG. 4, and §68) by adding an error to the frame. The error can be added without delaying the traffic. The receiving node will then reject the erroneous packet in its normal operation (§69). This provides a simplified firewall, and provides filtering without delaying normal traffic.

Embodiments of the method and apparatus in D1 are illustrated in more detail with reference to FIG. 3 (see §63-65), which illustrates deletion or discarding of an unwanted frame/packet at a receiver node according to the seven layer OSI model. An allowed data segment (31) traverses the communication link (35) alongside an unwanted data segment, which contains an error or an impurity (32). At the receiver node (36), the erroneous data segment is discarded as it is tested by the communication layers implemented in the receiver node, according to the OSI 7 layers model implementation. The allowed or error free data segments are passed by the communication layers on the receiver node to the upper layers and are validly processed by the application at the receiver node.

FIG. 4, of D1, is a block diagram of an apparatus for non-intrusive protection against unwanted data segments. The apparatus (40) comprises a detector (41). The detector (41) is used to detect data frames flowing through a communication link (45). The detector (41) is associated with an invalidator (42) which is configured to invalidate the detected data segment upon the data segment being deemed unwanted. The apparatus further includes a decision logic module (43), associated with the detector (41) and the invalidator (42), configured for deciding if the detected data segment is an unwanted one.

D1 provides an apparatus for protection against a hostile or any other unwanted frame or packet and prevents it from reaching the destination application, by invalidating it, thus destining it for removal from the communication chain. The apparatus is non-intrusive to the communication link. The apparatus can be positioned or deployed anywhere on the physical communication link that connects two communication nodes. Unlike prior Firewalls, the apparatus marks the packet/frame by invalidating the packet/frame, without terminating, interfering or blocking the flow of the packet/frame towards a recipient.

Thus D1 illustrates non-intrusive protection against unwanted data segments, wherein a transmitter node sends various frames or packets to a destination receiver. A physical link conveys these frames or packets from the transmitter to the receiver. The protective apparatus, according to D1, is deployed in the link and this apparatus allows all packets/frames to flow on to their respective recipients but intercepts and invalidates unwanted packets/frames. The unwanted packets/frames, invalidated by the protective apparatus, are rejected by regularly operated applications at the recipient node.

A drawback with this method is that such an apparatus, like a firewall, still has to be added to the communication link (see §72). Moreover, the unwanted data are still transmitted on the link from transmitter to receiver, and therefore the traffic on the link includes transmission of the unwanted data.

SUMMARY OF THE INVENTION

The present invention limits excessive network traffic to avoid that embedded devices are overwhelmed with deliberate or accidental unwanted traffic. The present invention overcomes the problem of the prior art by implementing filtering, for example in an embedded device or other electronic device of the industrial network. The traffic is filtered in the transmitter, such as transmitting part, of the embedded device. By discarding unwanted data already in a transmitting node, the traffic on the link is limited and a complete transmission of unwanted data packets is avoided.

The present invention provides an electronic device for communication in a data network comprising a communication circuit. The communication circuit is adapted for performing the network communication including controlling a plurality of network layers, a physical layer, a link layer and at least one higher order layer, and includes a protective circuit for identifying unwanted data or unwanted transmission of data. Especially, the protective circuit of the electronic device is arranged to monitor data during transmission of data from the electronic device, and identify unwanted data, and the communication circuit is adapted to avoid complete transmission of the unwanted data identified by the protective circuit, so that onward transmission of the unwanted data is restricted. Thus, the electronic device does not contribute to the creation of excessive traffic during a Denial of Service attack.

In this way the electronic device limits unnecessary network traffic due to unwanted data traffic, and avoids transmission of network overwhelming messages. Also, by avoiding onward transmission of unwanted data during the transmission operation, the authorised data traffic is not delayed.

Preferably, the communication circuit uses an Ethernet protocol for communication in the physical layer and the link layer. In more detail, the present invention may be implemented in an Ethernet based network, and filter the traffic by means of the physical layer (PHY) and the data link layer (MAC) during transmission from the electronic device. Moreover, the invention can be provided as an additional circuit in the data link layer or MAC, which additional circuit is adapted to detect and invalidate undesired frames and the physical layer or PHY stops transmitting the frames by functioning in its usual way, i.e. the invalidation means that the physical layer considers the frames invalid for transmission.

In a preferred embodiment, the protective circuit invalidates the unwanted data by asserting a control signal (without delay), so that the communication circuit, e.g. the PHY circuit, discards the unwanted data by stopping the transmission. The data is unauthorised or invalidated for communication according to the communication rules of the network layer stack, which layered stack the communication circuit controls. For example, the transmission is unauthorised according to an access control list employed and enforced by the communication circuit.

Preferably also, the protective circuit is arranged to monitor data transferred from the link layer to the physical layer during the transfer of this data from the link layer to the physical layer.

In a preferred embodiment, transmission is stopped during transfer from link layer to physical layer, by asserting the control signal controlling the physical layer circuit.

In a preferred embodiment, the communication circuit includes a physical layer transmitter for controlling transmission of the physical layer, a link layer transmitter for controlling transmission of the data link layer, and an error bus, or control signal, communicatively interconnecting the physical layer transmitter and the link layer transmitter and, wherein the protective circuit is operatively connected to the control signal bus and the protective circuit is adapted to invalidate the unwanted data by asserting the control signal, so that the physical layer transmitter discards the unwanted data, thus stopping the transmission of the unwanted data.

In another preferred embodiment, the communication circuit includes a physical layer transmitter for controlling transmission of the physical layer, link layer transmitter for controlling transmission of the data link layer, and a data bus communicatively interconnecting the physical layer transmitter and the link layer transmitter and, wherein the protective circuit is operatively connected to the data bus and is adapted to invalidate the unwanted data by changing the transferred data on the data bus, so that the physical layer transmitter discards the unwanted data.

In another preferred embodiment, the electronic device uses a communication protocol for the transfer on the data bus, which includes rules for discarding unallowed data, said protective circuit is adapted to change the unwanted data into such unallowed data of the protocol. A suitable criteria for identifying unwanted data is the number of data packets per time unit. Another criteria can be the destination address. The electronic device can be configured to only transmit data to certain addresses, and if the higher layers of the device tries to transmit to another unauthorised address the transmission is stopped.

The electronic device can be implemented in a communication unit adapted for operating in an industrial process, such as a sensor, or a IO device, or an actuator or an industrial monitoring device. It can also be implemented in network devices such as a gateway, a network manager, a wireless access node or in other communication units operating in an industrial environment.

As a complement, the filtering may also be implemented in a receiving node, such as a receiving part of the embedded electronic device, wherein a detecting circuit in the physical layer of the receiving part detects unwanted frames, and the link layer of the receiving part discards the unwanted frames, e.g. the physical layer, including the detecting circuit, of the receiving part is adapted to invalidate unwanted frames so that the link layer will discard the unwanted and invalidated frames. Such addition is implemented in an embodiment of the electronic device, wherein the protective circuit is arranged to also monitor data during reception of data in the electronic device, and identify received unwanted data, and the communication circuit is adapted to avoid transfer of the received unwanted data to the at least one higher order layer. Thus, the higher layers of the electronic device can remain unaffected by the arrival of unwanted traffic, such as during a Denial of Service attack.

DETAILED DESCRIPTION OF THE INVENTION

The invention provides a method, which preferably is implemented in an Ethernet communication node, the method blocks selected network traffic by relying on features present in the network, preferably the Ethernet physical layer PHY. The PHY by design, does not propagate packets when the MII reception error bus line TX_ERROR is asserted. On other busses where the control signals do not have dedicated separate bus lines, the PHY by design does not propagate packets that are marked with control data indicating an error.

A preferred implementation of the invention is a circuit connected between the Ethernet PHY and the Ethernet MAC. Ethernet frames are sent by the Ethernet MAC and unwanted frames are dropped or discarded by the Ethernet PHY and are not transmitted by the Ethernet PHY, thereby these unwanted frames do not impact network traffic, since they are stopped during transmission. The protective circuit can in this case be provided to override bus lines, e.g. by setting the error bus line, and thereby stop transmission. The invention can be implemented with a simple semiconductor circuit, such as a field programmable gate array, FPGA, requiring only a limited amount of resources. Alternatively the invention could be integrated into a PHY circuit, MAC circuit, CPU, other circuit of the electronic device or a combination of these.

Figure 1:
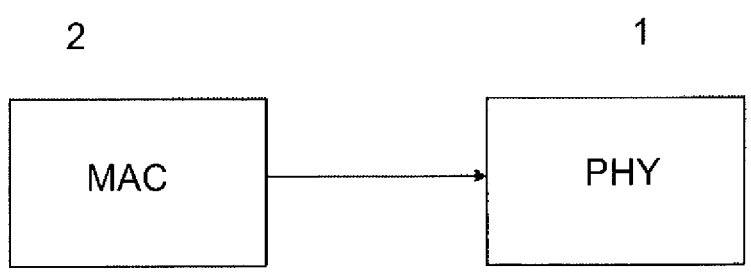
FIG. 1 illustrates a standard Ethernet physical layer circuit and link layer circuit for controlling the physical layer and the data link layer, respectively.

FIG. 1 shows a part of a known, standard Ethernet networking protocol illustrating the connection of a physical layer circuit (PHY) 1 to a media access controller (MAC) 2. The PHY and the MAC is a sublayer of the data link layer and provides the interface between the physical layer and the data link layer. The terms link layer and data link layer are used interchangeably. Embodiments of a communication unit in accordance with the present invention will also include other means for performing communication in a computer network, even if the preferred embodiments of such communication units mainly is modified in control of the physical layer and the data link layer.

Figure 3:
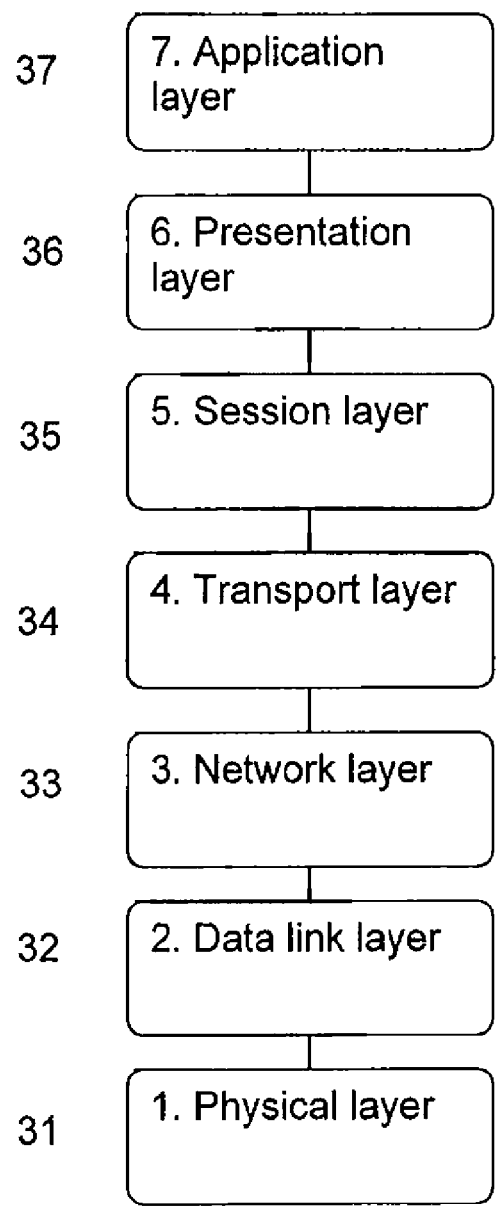
FIG. 3 illustrates the OSI model for data network communication.
Figure 4:
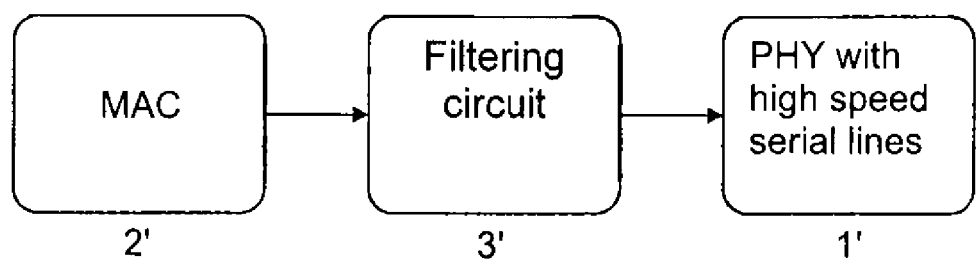
FIG. 4 illustrates an Ethernet physical layer circuit and link layer circuit, and the protective circuit of the invention arranged between the physical layer circuit and the link layer circuit.

FIG. 3 illustrates the seven network layers for computer communication in accordance with the OSI model. The invention is described with reference to this model. However, it is not necessary to implement the network layers in accordance with this model to benefit from the invention. The OSI model includes the physical layer 31, the data link layer 32, the network layer 33, the transport layer 34, the session layer 35, the presentation layer 36 and the application layer 7. It is mainly the functions of the physical 1 and link 2 layers that are modified when implementing the invention. The physical layer 1 of the OSI model handles bits, whereas the link layer 2 handles frames. Examples of networks used for communication in the physical 1 and data link layers 2 are Ethernet (or IEEE 802.3) and Token ring. The invention will be exemplified with reference to Ethernet.

In the OSI model, illustrated in FIG. 3, the first layer is the physical layer 31, which provides communication over a communication channel, and handles transmission of data bits through the transmission media, e.g. cable, optic fiber, twisted pair of copper wires, or wireless transmission like radio or microwave transmission. The second layer is the data link layer 32, which is arranged above the physical layer 31 and groups the data bits into frames, handles transmission errors and provides a link between the third layer, the network layer 33 of a transmitting machine and the network layer 33 of a receiving machine. Higher order layers in the OSI model are the fourth layer, the transport layer 34, the fifth layer called session layer 35, the sixth layer called presentation layer 36 and finally the seventh layer called the application layer 37. When a user communicates in an application, the application layer 37 of the computer (of the user) communicates with the application layer 37 of another computer, whereby the communication is transferred from layer to layer 37-31 of the computer, from the application layer 37 through the higher layers, like presentation 36, session 35, transport 34 and network layer 33, to the data link layer 32 and is further transferred to the physical layer 31 from where the communication is effectuated through the physical medium to the other computer. The data received by the other computer is received from the physical medium and transferred by the physical layer 31 of the other computer and to its data link layer 32 and from the data link layer 32 to the network layer 33 and subsequently from layer to layer through the higher layers, all the way through every layer to the application layer 34 of the other computer. Different networks organise their communication layers in their respective ways, the OSI model is a "universal" model of computer networks, and networks need not, and do not, include all OSI model layers in an organisation. The Ethernet is a communication standard and handles both the physical layer 31 and the link layer 32 and the transfer of data between the physical layer 31 and the data link layer 32. The data link layer 32 of Ethernet includes a sublayer called the media access control sublayer and the Ethernet link layer is called MAC herein.

Figure 2:
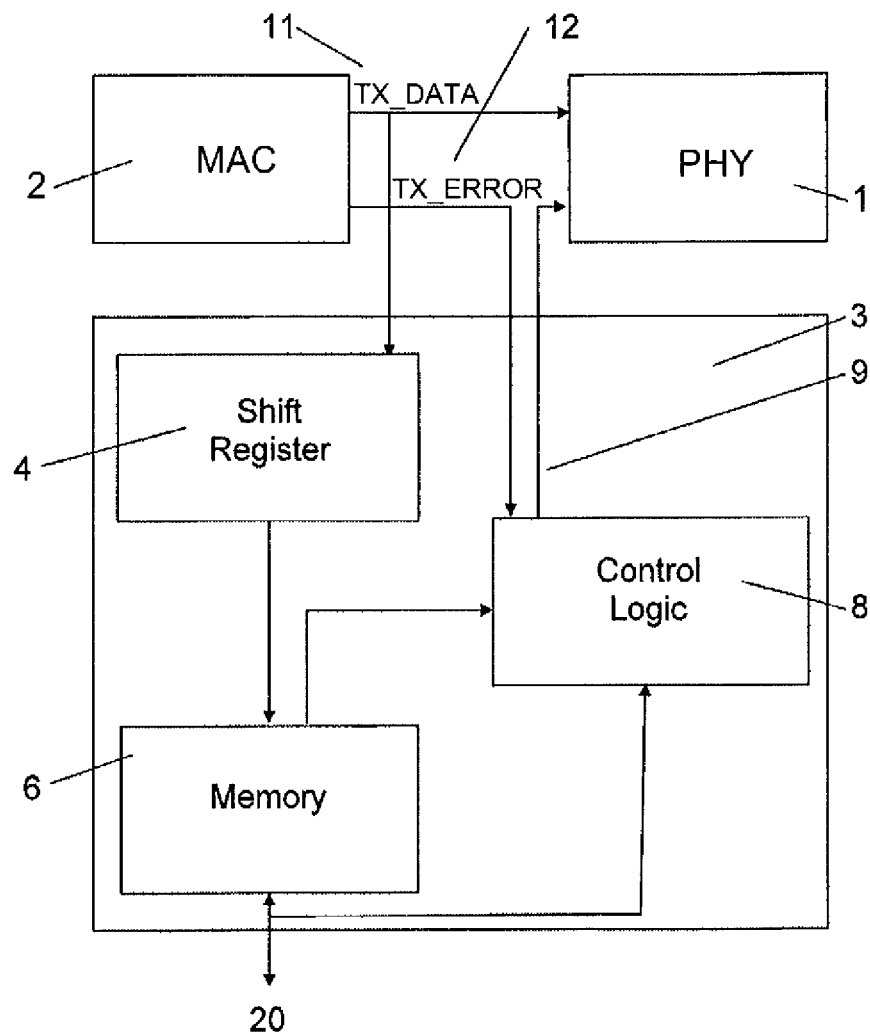
FIG. 2 illustrates a physical layer transmitter, link layer transmitter, and a protective circuit in accordance with the invention.

Of particular importance for the present invention is the transfer of data between the physical layer 1 and the link layer 2. FIG. 2 illustrates a circuit 3 in accordance with an embodiment of the present invention, which circuit 3 is connected to a data bus 11 (Tx_DATA) between the link layer circuit 2 (MAC) and the physical layer circuit 1 (PHY). The circuit 3 is arranged to monitor the transfer through the data bus 11, 12 between the link layer circuit 2 and the physical layer circuit 1, and invalidate the transfer upon detection of unwanted data transfer so that the transmission is interrupted. The circuit 3 can be seen as a protective circuit 3, which is adapted to limit unnecessary traffic, i.e. avoid complete transmission of unwanted data, by interfering with data transferred from the data link layer to the physical layer, and prevent transmission of the unwanted data from the physical layer of the device (or the physical layer circuit of the electronic device), through the transmission medium, and thus, limiting network traffic. The protective circuit 3 does not delay the data transfer between the link layer and the physical layer. The interfering may be made by asserting a control signal and interrupting the transfer of unwanted data from data link layer to the physical layer. The protective circuit 3 is adapted to perform a non-interfering monitoring of the data on the bus 11, 12 and determine if the data is unwanted. When unwanted data is detected, the protective circuit 3 is adapted to invalidate the data so that the PHY deletes the unwanted data. The invalidation can be effectuated by setting an error line 12 or tampering with the data on the data signal line 11 into erroneous data frames.

The protective circuit 3 is preferably compatible with a media independent interface (MII) bus 11 connected between the PHY 1 and MAC 2 unit. The protective circuit 3 may be embodied with a MII. The MII bus 11 between the PHY unit 1 and the MAC unit 2 is arranged with a separate data line Tx_DATA 11 and control line Tx_ERROR 12, for data signals and control signals, respectively. The figure shows that the protective circuit has a temporary memory or registers 4, a memory 6, an interface to an external circuit 20, for instance a CPU, and the protective circuit or unit 3 has also a control unit or control logic 8. An error detecting interface in the MII, preferably a reception error bus or line Tx_ERROR 9, is connected to a signal line of the MAC 2. The media independent interface (MII) may be a reduced media independent interface (RMII) or another variation of a media independent interface, such as a Gigabit media independent interface (GMII), reduced Gigabit media independent interface (RGMII) or other bus with separate control and data lines.

In FIG. 2 the PHY 1 is connected directly to the MAC 2, and the circuit 3 is also connected to the same bus. The error line Tx_ERROR is connected through the protective circuit 3 between PHY and MAC. The protective circuit 3 is provided with a list of traffic rules, preferably stored in a filter memory storage device 6, used for comparison to detect unwanted or wanted network traffic, and these traffic rules include traffic analysis based on transmission rate and addresses. The traffic rules controlling the transmission rate preferably comprise a maximum limit for data transmission per time unit. The protective circuit 3, which for example is provided with software that is stored in memory 6 and executed by control unit 8, is adapted to prevent transmission when the maximum limit is exceeded. The traffic rules for addresses are adapted for two groups of addresses, a first set of addresses to legitimate addresses (whitelist), and a second set of addresses to unwanted addresses (blacklist). The protective circuit 3 is adapted to allow traffic to the legitimate addresses and to prevent transmission to the unwanted addresses.

The traffic rules are suitably updated. The electronic device are adapted so that the traffic rules can be updated in different ways, for example, the rules are updated by the embedded system of the electronic device, or rules are provided by the vendor, or provided by means of the environment which the embedded system is operating in.

The traffic rules may be updated and changed by the system, for instance by information routed through external circuit 20 or in the control logic 8. Moreover, the filtering may be turned on or off. Transmitting without asserting the bus control line when filtering is off, and letting unwanted traffic be transmitted. When turned on, the filtering asserts the bus control line Tx_ERROR, when unwanted data is detected. The protective circuit is provided with selection criteria for turning the filtering scheme on or off, which comprise criteria such as a limit on number of packets per time unit. The criteria is provided in software stored in the protective circuit, and include number of packets per time unit that have, for example, been supplied from the embedded system, or by the CPU.

The number of data packets received per unit time is noted and may be recorded. This may be carried out within the control logic 8 of the protective unit 3, or it may be carried out by receiving through a line in to the protective unit, for example from external circuit 20, information from an external device or circuit about the rate of packets, which information may be calculated or processed in the control logic 8 to arrive at a rate of data packets received per unit time.

When active, the decision logic module circuit or control logic 8 checks the content of the Ethernet Frames, and matches this to the access control list containing the traffic rules. If there is, for example no match with any data in a white list, the circuit 3 asserts Tx_ERROR line 9 of the media independent interface (MII) or other control (Tx_ERROR) to indicate an error in the Ethernet Frame (as seen in FIG. 2).

Note that the filtering may optionally be switched on when the number of data packets received per unit time reaches or exceeds a predetermined number, which number can be different from the number used for stopping transmission. The number of discard events when unwanted data packets are discarded may be detected and preferably recorded. Data concerning discarded unwanted data packets may be logged and/or information recorded about characteristics such as the amount of network traffic, time of data packet discard. Discarded traffic may be logged by the filtering circuit and stored for processing at a later time.

Significantly, the protective circuit 3 does not delay Ethernet Frames by storing them and sending them to the PHY at a later time. The rejected Ethernet frames are discarded, rejected by the PHY circuit in the physical layer, and is not transmitted. As a complement, the protective circuit 3 may include connections to the receiving part of the Electronic device, by signal lines (similar to FIG. 3) connected to a data bus Rx_Data, Rx_Error between the MAC receiver and PHY receiver of the communication circuit. In this case the protective circuit should be adapted to identify unwanted data that is received during transfer of this data from the PHY receiver to the MAC receiver and invalidate the unwanted data so that the MAC receiver discards the unwanted data and avoids transferring the unwanted data further. In this way, the unwanted data is prevented from reaching higher layers (such as layers conforming with the OSI model layers 33-37 see FIG. 3) in the network stack of the processor in the embedded network device.

It is particularly advantageous to use a connection to the Rx_Data_bus in the protective circuit 3 for filtering traffic to detect certain types of unwanted traffic depending, for example, on the environment. This is because selected traffic rules or a finite access control list such as a blacklist may be applied in the receiver Rx part of the communication circuit while other traffic rules are applied in the transmitter (Tx) part of circuit 3. This may be used to distribute the processing overhead in the circuit. Secondly, additional information about numbers, packet flow patterns, times and types of identified data traffic may be recorded and used for example to update the traffic rules or the access control lists. Additional criteria for the communication circuit traffic rules for use with the receiver Rx part may include source addresses, such as in the form of a whitelist and/or blacklist of source addresses.

What is claimed is:

1. An electronic device for communication in a data network comprising a communication circuit adapted for performing the network communication, which communication includes controlling a plurality of network layers, said layers including a physical layer, a link layer and at least one higher order layer,
the communication circuit includes a protective circuit for identifying unwanted data,
characterised in that
the protective circuit is arranged to monitor data during transmission of data from the electronic device, and identify unwanted data to allow transmission to legitimate addresses and to prevent transmission to unwanted addresses,
and the communication circuit is adapted to avoid transmission of the unwanted data identified by the protective circuit.

2. The electronic device according to claim 1, wherein said protective circuit is provided to invalidate the unwanted data, so that the communication circuit discards the unwanted data.

3. The electronic device according to claim 1, wherein the protective circuit is arranged to monitor data transferred from the link layer to the physical layer during the transfer of this data from the link layer to the physical layer.

4. The electronic device according to claim 2, wherein the invalidation is performed by insertion of errors during transfer from link layer to physical layer, which errors are detectable in the physical layer.

5. The electronic device according to claim 4, wherein the communication circuit includes a physical layer transmitter for controlling transmission of the physical layer, a link layer transmitter for controlling transmission of the data link layer, and an error line communicatively interconnecting the physical layer transmitter and the link layer transmitter and wherein the protective circuit is operatively connected to the error line and adapted to invalidate the unwanted data by setting the error line, so that the physical layer transmitter discards the unwanted data.

6. The electronic device according to claim 4, wherein the communication circuit includes a physical layer transmitter for controlling transmission of the physical layer, link layer transmitter for controlling transmission of the data link layer, and an data line communicatively interconnecting the physical layer transmitter and the link layer transmitter and, wherein the protective circuit is operatively connected to the data line and is adapted to invalidate the unwanted data by changing the transferred data on the data bus, so that the physical layer transmitter discards the unwanted data.

7. The electronic device according to claim 6 wherein a communication protocol is used for the transfer on the data line, which protocol includes rules for discarding unallowed data, said protective circuit is adapted to change the unwanted data into such unallowed data of the protocol.

8. The electronic device according to claim 1, wherein the communication circuit uses an Ethernet protocol for communication in the physical layer and the link layer.

9. The electronic device according to claim 1, wherein a criterion for identifying unwanted data is a number of data packets per time unit.

10. The electronic device according to claim 1, wherein a criterion for identifying unwanted data is a list of addresses.

11. The electronic device according to claim 1, wherein the protective circuit is arranged to monitor data during reception of data in the electronic device, and identify received unwanted data, and the communication circuit is adapted to avoid transfer of the received unwanted data to the at least one higher order layer.

12. The electronic device according to claim 1, wherein the electronic device is a sensor, or an IO device, or an actuator or a monitoring device.

13. The electronic device according to claim 1, wherein the electronic device is used in a system for monitoring and control of an industrial process control system.

14. The electronic device according to claim 1, wherein selected network traffic is blocked by asserting a reception error bus line in an Ethernet physical layer.

15. The electronic device according to claim 1, wherein filtering of network traffic is switched on when a number of data packets received per unit time reaches a predetermined number.

* * * * *